Sept. 27, 1932.   F. O. RICE   1,879,497
PREPARATION OF KETENE
Filed Feb. 27, 1930
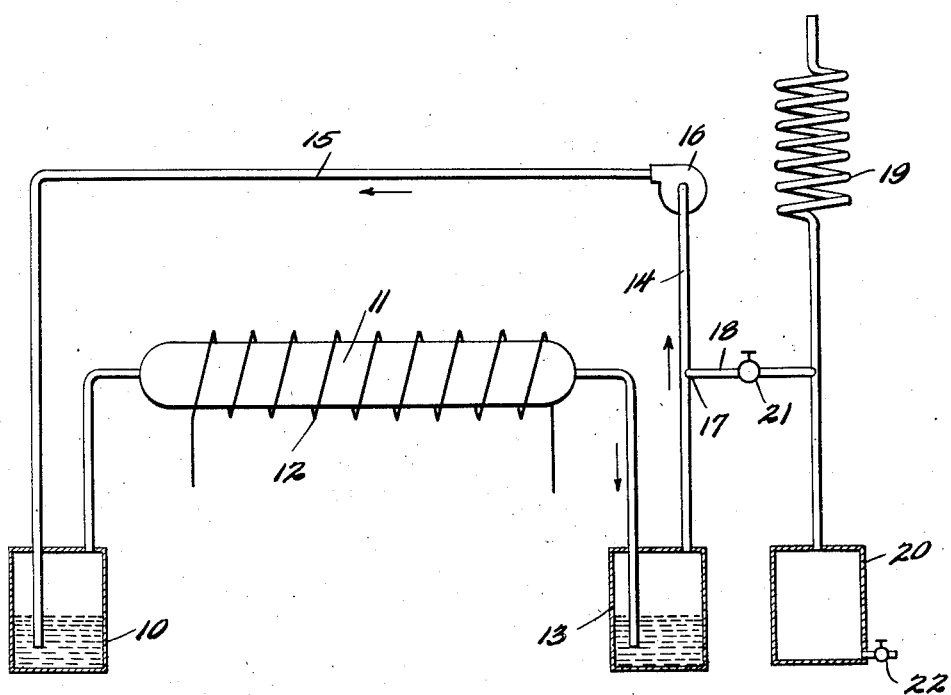

Patented Sept. 27, 1932

1,879,497

UNITED STATES PATENT OFFICE

FRANCIS OWEN RICE, OF BALTIMORE, MARYLAND, ASSIGNOR TO ROHM & HAAS COMPANY, OF PHILADELPHIA, PENNSYLVANIA, A CORPORATION OF DELAWARE

PREPARATION OF KETENE

Application filed February 27, 1930. Serial No. 431,873.

The present invention relates to the manufacture of organic compounds belonging to that group known as ketenes, which may be considered as internal anhydrides of acetic acid and its substitution derivatives, and which have the general formula $R:C:O$, where R is a divalent organic radical, as in the case of methyl ketene, which is represented by the formula $CH_3CH:C:O$; and the invention relates more particularly to the preparation of ketene, itself, which is a member of this group and is represented by the formula $CH_2:C:O$.

It is an object of this invention to provide a method of manufacture of ketene or other members of this group, which is efficient and economical and by which the amount of ketene obtained from a given quantity of material may be increased and excessive decomposition of the ketene produced may be minimized.

Other objects and features of novelty will be apparent from the following description in which certain processes embodying the principles of my invention are set forth by way of example, but it is to be understood that my invention is in no wise limited to the details described but includes changes and modifications within the scope of the subjoined claims.

The single figure in the accompanying drawing represents a diagram of the apparatus used in a preferred method embodying my invention.

Ketene was discovered by N. T. M. Wilsmore (Jour. Chem. Soc., 1907, Vol. 91, page 1938), among the gaseous products resulting from the decomposition of acetic anhydride by contact with an electrically heated platinum wire. Subsequently it has generally been prepared by passing acetone, acetic acid, or acetic anhydride through a heated combustion tube or furnace, but its production has been attended by an extremely low yield of ketene, namely, between 11% and 20% of the total quantity available. Much research and experimentation has been done with a view to increasing the yield of ketene in proportion to the anhydride or ketone which is decomposed by the application of heat, and it has been suggested that certain catalysts, such as metal sulphates, be used in order to prevent the degenerative decomposition of the ketene produced. It has also been found that the degenerative decomposition of the ketene was greatly increased by the presence of iron or nickel in the combustion chamber, even in the most minute quantities.

In most of such experiments wherein ketene has been obtained in measurable quantities, the acetone or other substance from which the ketene is to be obtained has been introduced into the combustion chamber alone, either in the form of a vapor or liquid, the reaction temperature has been between 600° and 740° C., and the quantity of acetone decomposed has been comparatively high.

I have discovered, however, that in the practice of my method of preparing ketene, the yield of ketene was either unaffected or positively diminished by the presence of catalysts. I therefore prefer to carry out the reaction in a vessel constructed, for example, of pure silica which has no catalytic power upon either the acetone or other ketone being decomposed, or upon the ketene produced.

I have also discovered that by diluting the acetone vapor with gases which result from the decomposition of the acetone in the furnace, the yield of ketene is very greatly increased. I have found that the yield of ketene is increased by increasing the dilution of the acetone vapor, an appreciable increase in yield being obtained by a dilution of only three or four times, although the dilution can be carried much further if desired. The dilution of the acetone vapor in this manner has the additional advantage that a greater fraction of the acetone passing through the furnace or combustion chamber may be decomposed without decomposition of the ketene. While it is most desirable to use the gases resulting from the decomposition of the acetone in the furnace, it is possible to use an inert gas such as nitrogen, methane, carbon monoxide, or the like as the diluent.

Another method of attaining the desired dilution of the acetone or other vapor is to carry out the process under a partial vacuum.

I have also discovered that, as the temperature of the furnace is raised, the ketene becomes relatively more stable than the acetone; for example, if acetone is passed through the furnace at 600° C. and then the same quantity of acetone is passed through at 700° C., and if, in both experiments, the rate of passage of the acetone is such that half of the quantity used is decomposed, the yield of ketene will be much greater at 700° C. This increase in yield, calculated on the basis of acetone decomposed, continues at greatly increased temperatures and is only affected by the rate at which the vapor is passed through the tube. Consequently, the reaction furnace may be heated to much higher temperatures than have formerly been employed, namely, within the range of 740° to 1200° C.

One example of the practice of my invention will now be described. Referring to the drawing, the gases resulting from the decomposition of acetone from which the unchanged acetone has been removed by cooling or some other suitable means, are bubbled through liquid acetone in a vessel which is maintained at a suitable temperature depending upon the concentration of acetone desired in the gases entering the furnace. The gas is thus saturated with acetone vapor at the temperature of this vessel. The mixture is then passed through a combustion tube made of ordinary opaque quartz having a fused finish on the interior thereof. This tube is heated, electrically or otherwise, to a temperature of between 550° and 1200° C. Good yields have been obtained at temperatures in the neighborhood of 600° C.

I have found that the smaller the fraction of acetone decomposed, the greater will be the yield of ketene calculated on the basis of the amount of acetone decomposed, so that if a very high yield is required the rate of flow of gas and vapor through the furnace is regulated so that only a small fraction of acetone is decomposed during a single passage. I have determined that the best practical yield is obtained when less than 10% of the acetone is decomposed in a single passage through the furnace.

High yields may also be obtained if the temperature of the vessel 10 containing the liquid acetone through which the gases resulting from the acetone decomposition is bubbled, is maintained at a relatively low figure so that there is a correspondingly low concentration of acetone in the saturated gaseous mixture. This enables a greater fraction of acetone to be decomposed in a single passage through the furnace but still permits a high yield of ketene.

When the mixture of unchanged acetone, ketene, and gases resulting from this decomposition, as well as those used to dilute the acetone, leaves the furnace, they may be passed through a cooling apparatus in order to remove the unchanged acetone; or they may be passed directly into a vessel which contains the material to be treated or combined with the ketene, the unchanged acetone being then recoverable from the last mentioned vessel.

When, in order to obtain very high yields of ketene, only a small fraction of the acetone is decomposed during a single passage through the furnace, and the gaseous mixture from the furnace is passed directly into the vessel containing the substance to be treated by the ketene, the following method may be pursued. The temperature of this vessel is maintained at such a degree that the actone does not condense, and the mixture leaving the vessel is passed through the furnace again so that the process becomes a circulatory one in which the gases resulting from the decomposition and the undecomposed acetone may pass through the furnace a number of times. A portion of the gaseous products of decomposition, namely, methane, carbon monoxide, ethylene, and the like can be run off from time to time to prevent a too great accumulation of them in the system.

A preferred embodiment of this circulatory process will be described with reference to the drawing. The gases resulting from the decomposition of the acetone or other ketene producing organic compound are bubbled through the vessel 10 which is maintained at a suitable temperature, depending upon the concentration of acetone desired in the gases entering the furnace. The mixture of gases and acetone vapors is passed through the furnace 11 which is formed of a noncatalytic material such as fused quartz and is heated electrically by means of the coil 12 or in any other suitable manner. The gases leaving the furnace 11 are passed into the vessel 13 which contains the compound in the liquid state which is to react with the ketene. The gases are bubbled through the liquid and a series of vessels may be used if this is found necessary for the complete absorption of the ketene. The vessel 13 may be surrounded by a water jacket so that its temperature can be regulated conveniently, and any other refinements of apparatus may be employed in the exemplary embodiment illustrated within the scope of the invention.

In many cases it will be possible to maintain the temperature high enough so that practically none of the unchanged acetone remains in the vessel 13. In case it is necessary to keep a low temperature in the vessel 13 which would result in the condensation of the unchanged acetone therein, the acetone may be separated by distillation when the contents of the vessel 13 are drawn off.

The gases resulting from the decomposition and also the undecomposed acetone, after leaving the vessel 13 in which the ketene is removed, are then passed through the conduits 14 and 15 by means of the pump or fan 16 which serves to transfer them back to the vessel 10 whereupon the cycle is repeated. At the point 17 of the conduit 14 a branch conduit 18 is connected and provides communication with a condenser 19 which is maintained at a temperature below zero degrees C. The lower end of the condenser is connected with the vessel 20. The branch conduit 18 is provided with the valve or stop cock 21. From time to time, by opening the stop cock 21 the decomposition products may be admitted to the condenser 19 from which the permanent gases may escape but which serves to condense the unchanged acetone which may be collected in the vessel 20 and drawn off at 22 and returned to the vessel 10.

As heretofore mentioned, the dilution or dispersion of the acetone or other vapor may be attained by performing the reaction under a partial vacuum. In this method, the whole apparatus would be evacuated by means of a pump or aspirator, and the vapor, either with or without dilution with the gaseous decomposition products, passed through the furnace at a pressure of less than 760 mm. of mercury.

This method and modifications thereof within the scope of the present invention may be used for preparing ketene from acetic acid or acetic anhydride, as well as acetone and may also be used for preparing higher ketenes from the corresponding ketone or acid, as for example, methyl ketene $CH_3CH:C:O$ from di-ethyl ketone, or from propionic acid.

As already pointed out, one important advance over the prior art which is accomplished by the present invention is the elimination of all materials from the reaction chamber which could possibly act as a catalyst during the reaction, whether or not they have heretofore been thought necessary to promote the decomposition of the original compound or to prevent the degenerative decomposition of the ketene produced.

Having thus described the invention, what is claimed as new and desired to be secured by Letters Patent is:

1. The method of manufacturing ketene which comprises passing the vapor of an organic compound capable of yielding ketene upon pyrogenic decomposition at a temperature of 740° to 1200° C. through a combustion chamber made of silica and which is free of all substances that may exert a deteriorating effect upon the reaction, and recovering the ketene thus formed.

2. The method of manufacturing ketene which comprises passing the vapor of an organic compound capable of yielding ketene upon pyrogenic decomposition at a temperature of 740° to 1200° C. and a pressure less than atmospheric through a combustion chamber made of silica and which is free of all substances that may exert a deteriorating effect upon the reaction, and recovering the ketene thus formed.

3. The method of manufacturing ketene which comprises mixing a diluent gas with the vapor of an organic compound capable of yielding ketene upon pyrogenic decomposition, passing the resulting vapor mixture through a combustion chamber made of silica and which is free of all substances that may exert a deteriorating effect upon the reaction heated to a temperature from 740° to 1200° C., and recovering the ketene thus formed.

4. The method of manufacturing ketene which comprises mixing a diluent gas with the vapor of an organic compound capable of yielding ketene upon pyrogenic decomposition, passing the resulting mixture through a combustion chamber made of quartz and which is free of all substances that may exert a deteriorating effect upon the reaction heated to a temperature of 550° to 1200° C., controlling the rate of flow of said mixture through said chamber so that not more than 10% of the ketene yielding compound is decomposed, and recovering the ketene thus formed.

5. The method of manufacturing ketene which comprises mixing a diluent gas with the vapor of an organic compound capable of yielding ketene upon pyrogenic decomposition, passing the resulting mixture through a combustion chamber made of quartz and which is free of all substances that may exert a deteriorating effect upon the reaction heated to a temperature from 740° to 1200° C. and at a pressure less than atmospheric, and recovering the ketene thus formed.

6. The method of manufacturing ketene which comprises passing acetone vapors through a combustion chamber made of silica and which is free of all substances that may exert a deteriorating effect upon the reaction heated to a temperature above 740° C., and recovering the ketene thus formed.

7. The method of manufacturing ketene which comprises mixing a diluent gas with acetone vapors, passing the resulting mixture in the absence of a catalytic material through a combustion chamber made of silica and which is free of all substances that exert a deteriorating effect upon the reaction heated to a temperature above 740° C., and recovering the ketene thus formed.

8. The method of manufacturing ketene which comprises mixing a diluent gas with acetone vapors, passing the resulting mixture through a combustion chamber made of quartz and which is free of all substances that may exert a deteriorating effect upon the reaction heated to a temperature above 740° C., controlling the rate of flow of said mixture through said chamber so that not more than 10% of the acetone is decomposed, and recovering the ketene thus formed.

9. The method of manufacturing ketene which comprises mixing a diluent gas with acetone vapors, passing the resulting mixture through a combustion chamber made of quartz and which is free of all substances that may exert a deteriorating effect upon the reaction heated to a temperature above 740° C., controlling the rate of flow of said mixture through said chamber so that not more than 10% of the acetone is decomposed, separating the ketene from the products of reaction, and returning the products of reaction to the process for use in diluting a further portion of acetone.

In testimony whereof I hereunto affix my signature.

FRANCIS OWEN RICE.